(12) United States Patent
Liebman et al.

(10) Patent No.: US 7,715,149 B1
(45) Date of Patent: May 11, 2010

(54) DISK DRIVE INCLUDING AN ACTUATOR LATCH WITH A CATCH PORTION AND A CRASH STOP PORTION OF LESSER MATERIAL STIFFNESS THAN THE CATCH PORTION

(75) Inventors: Michael K. Liebman, Sunnyvale, CA (US); Scott E. Watson, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 1120 days.

(21) Appl. No.: 11/345,141

(22) Filed: Feb. 1, 2006

(51) Int. Cl.
  *G11B 5/54* (2006.01)
  *G11B 21/22* (2006.01)
(52) U.S. Cl. .................... 360/256.2; 360/256
(58) Field of Classification Search ....... 360/256–256.6
  See application file for complete search history.

(56) References Cited

U.S. PATENT DOCUMENTS

| | | | | |
|---|---|---|---|---|
| 4,692,829 | A * | 9/1987 | Campbell | ............... 360/256.1 |
| 4,881,139 | A | 11/1989 | Hazebrouck | |
| 5,363,261 | A * | 11/1994 | Eckberg et al. | ........... 360/256.2 |
| 5,365,389 | A * | 11/1994 | Jabbari et al. | ............ 360/265.1 |
| 5,369,538 | A * | 11/1994 | Moe et al. | |
| 5,404,257 | A * | 4/1995 | Alt | |
| 5,455,726 | A * | 10/1995 | Liu | |
| 5,483,399 | A * | 1/1996 | Jeong et al. | |
| 5,543,986 | A * | 8/1996 | Albrecht | |
| 5,600,516 | A | 2/1997 | Phillips et al. | |
| 5,659,449 | A | 8/1997 | Brooks, Jr. et al. | |
| 5,668,683 | A * | 9/1997 | Stone | ..................... 360/256.1 |
| 5,734,527 | A | 3/1998 | Reinhart | |
| 5,768,058 | A | 6/1998 | Hofland | |
| 5,793,572 | A | 8/1998 | Lalouette et al. | |
| 5,870,256 | A * | 2/1999 | Khanna et al. | |
| 6,028,746 | A * | 2/2000 | Matsumura | ............... 360/256.4 |
| 6,118,636 | A | 9/2000 | Hatch et al. | |
| 6,134,077 | A | 10/2000 | Misso et al. | |
| 6,163,440 | A * | 12/2000 | Takahashi et al. | |
| 6,185,074 | B1 | 2/2001 | Wang et al. | |
| 6,215,628 | B1 | 4/2001 | Boutaghou | |
| 6,252,745 | B1 | 6/2001 | McReynolds et al. | |
| 6,327,119 | B1 | 12/2001 | Barina et al. | |
| 6,339,521 | B1 * | 1/2002 | Durrum et al. | ........... 360/256.1 |
| 6,381,102 | B1 * | 4/2002 | Strom et al. | ................ 360/256 |
| 6,400,533 | B1 | 6/2002 | Liu et al. | |
| 6,501,624 | B1 * | 12/2002 | Gillis et al. | |
| 6,507,461 | B1 | 1/2003 | Kimura et al. | |
| 6,529,349 | B1 * | 3/2003 | Byun et al. | |

(Continued)

*Primary Examiner*—William J Klimowicz
*Assistant Examiner*—Adam B Dravininkas

(57) ABSTRACT

A disk drive includes an actuator rotatably coupled to a disk drive base. A fixed member is in fixed spatial relation to the base. A latch is rotatably coupled to the base. The latch includes a catch portion in contact with the actuator with the latch closed and not in contact the actuator with the latch open. The catch portion comprises a first material. The latch includes a crash stop portion comprising a second material having a lesser stiffness than the first material. The crash stop portion includes a stop portion and a pusher portion. The stop portion is in contact with the fixed member with the latch closed and not in contact with the fixed member with the latch open. The pusher portion is in contact with the actuator with the latch closed and with the actuator in an extreme rotational position.

12 Claims, 11 Drawing Sheets

U.S. PATENT DOCUMENTS

| | | |
|---|---|---|
| 6,535,357 B1 | 3/2003 | Misso et al. |
| 6,535,358 B1 | 3/2003 | Hauert et al. |
| 6,535,359 B1 | 3/2003 | Boutaghou |
| 6,574,073 B1 | 6/2003 | Hauert et al. |
| 6,600,515 B2 | 7/2003 | Bowyer et al. |
| 6,624,980 B1 * | 9/2003 | Watson et al. |
| 6,650,507 B2 | 11/2003 | Nelson et al. |
| 6,710,980 B1 * | 3/2004 | Hauert et al. |
| 6,731,468 B2 | 5/2004 | Williams et al. |
| 6,744,604 B2 | 6/2004 | Misso |
| 7,061,723 B2 | 6/2006 | Price |
| 2003/0035246 A1 | 2/2003 | Byun et al. |
| 2004/0141256 A1 | 7/2004 | Hong et al. |
| 2004/0145831 A1 | 7/2004 | Kanada et al. |
| 2004/0145832 A1 * | 7/2004 | Kanada et al. ............ 360/256.4 |
| 2004/0257709 A1 * | 12/2004 | Lee et al. .................... 360/256 |
| 2005/0264941 A1 * | 12/2005 | Tsuda et al. |

* cited by examiner

DISK DRIVE INCLUDING AN ACTUATOR LATCH WITH A CATCH PORTION AND A CRASH STOP PORTION OF LESSER MATERIAL STIFFNESS THAN THE CATCH PORTION

FIELD OF THE INVENTION

The present invention relates generally to disk drives, and in particular a disk drive with an actuator latch with a catch portion and a crash stop portion comprising a material of lesser stiffness than the catch portion.

BACKGROUND

The typical hard disk drive includes a head disk assembly (HDA) and a printed circuit board assembly (PCBA) attached to a disk drive base of the HDA. The head disk assembly includes at least one disk (such as a magnetic disk, magneto-optical disk, or optical disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. In an optical disk drive, the head will typically include a mirror and objective lens for reflecting and focusing a laser beam on to a surface of the disk. The head stack assembly is controllably positioned in response to the generated servo control signals from the disk controller. In so doing, the attached heads are moved relative to tracks disposed upon the disk.

The spindle motor typically includes a rotatable spindle motor hub, a magnet attached to the spindle motor hub, and a stator. Various coils of the stator are selectively energized to form an electromagnetic field that pulls/pushes on the magnet, thereby imparting a rotational motion onto the spindle motor hub. Rotation of the spindle motor hub results in rotation of the attached disks.

The head stack assembly includes an actuator assembly, at least one head gimbal assembly, and a flex circuit assembly. A conventional "rotary" or "swing-type" actuator assembly typically includes an actuator having an actuator body. The actuator body has a pivot bearing cartridge to facilitate rotational movement of the actuator assembly. One or more actuator arms extend from the actuator body. Each actuator arm supports at least one head gimbal assembly that includes a head. An actuator coil is supported by the actuator body opposite the actuator arms. The actuator coil is configured to interact with one or more magnets, typically a pair, to form a voice coil motor. The printed circuit board assembly controls current passing through the actuator coil that results in a torque being applied to the actuator.

A latching mechanism is provided to facilitate latching of the actuator in a parked position when the heads are not being used to interact with the tracks on the disk. In the parked position, the actuator is positioned with the heads either at an inner diameter (ID) of the disk or at or beyond an outer diameter (OD) of the disk such as upon a ramp. A crash stop coupled to the disk drive base is provided to limit rotation of the actuator in a given direction. The crash stop is configured to contact a portion of the actuator when the actuator is rotated in a given rotational direction. Another crash stop may be provided to limit actuator rotation in an opposite rotational direction. The latching mechanism may additionally function as one of the crash stops.

Disk drives have found an ever increasing utility for use in a small mobile electronic devices. Such devices may include laptop and hand-held computing devices, audio devices, audio/video devices, and personal electronic organizers, for examples.

Due to the portable nature of such small mobile electronic devices, there is an enhanced risk that the device may be subject to mechanical shock events. This may occur in the case where the device is dropped for example. During a mechanical shock event, the disk drive base may experience significant rotational acceleration that can cause a sudden relative rotation of the actuator. Such sudden relative rotation of the actuator may result in damage to the actuator, especially the attached head gimbal assemblies. The adjacent disk(s) may be impacted as well, which may result in loss of data. Various latch designs have attempted to secure the actuator during such mechanical shock events. However, many such designs have proven to be complex, costly or unreliable.

In addition, contact between the latch and the actuator during operation may be noisy. This may be particularly undesirable in the context of portable electronic devices if such devices are operated in proximity to the user and/or in a quiet environment. Further, such contact may result in undesirable particle generation or release internal to the disk drive.

Accordingly, it is contemplated that there is need in the art for an improved actuator latch configuration.

SUMMARY

According to an aspect of the present invention, there is provided a disk drive. The disk drive includes a disk drive base. The disk drive further includes a fixed member in fixed spatial relation to the disk drive base. The disk drive further includes an actuator rotatably coupled to the disk drive base. The disk drive further includes a latch rotatably coupled to the disk drive base. The latch includes a catch portion in contact with the actuator with the latch in a closed position. The catch portion is not in contact the actuator with the latch in an open position. The catch portion comprises a first material. The latch further includes a crash stop portion comprising a second material having a lesser stiffness than the first material. The crash stop portion includes a first stop portion and a pusher portion. The first stop portion is in contact with the fixed member with the latch in the closed position. The first stop portion is not in contact with the fixed member with the latch in the open position. The pusher portion is in contact with the actuator with the latch in the closed position and with the actuator in an extreme rotational position.

Either or both of the first stop portion and the pusher portion may comprise the second material. The pusher portion and the first stop portion may both be a single component having material continuity rather than an assembly of subcomponents. The latch may include a latch arm and the latch arm may include the catch portion, an arm body portion supporting the catch portion, and an arm damping portion. The arm damping portion may comprise the second material. The pusher portion, the first stop portion, and the arm damping portion may all be a single component having material continuity rather than an assembly of subcomponents. The latch may further comprise a second stop portion in contact with the fixed member with the latch in the open position. The second stop portion is not in contact with the fixed member with the latch in the closed position, and the second stop portion comprises the second material. The pusher portion, the first stop portion, and the second stop portion may all be a single component having material continuity rather than an assembly of subcomponents.

In addition, the fixed member may be a disk drive base wall of the disk drive base. The crash stop portion may include a support portion. The support portion may support the first stop portion and may comprise a material having a stiffness greater than the first stop portion. The first stop portion may comprise the second material. The support portion may comprise the first material. The latch may be biased to the open position. The latch may further include a latch biasing element comprising a third material that is a ferromagnetic metal material. The disk drive may further include a VCM magnet disposed adjacent the actuator, and the latch biasing element may be magnetically attracted towards the VCM magnet. The actuator may include a catch, and the catch portion may be in contact with the catch with the latch in a closed position. The catch may be in the shape of a hook. The first material may comprise a polycarbonate material and the second material may comprise a polyurethane material.

DESCRIPTION OF THE PREFERRED EMBODIMENTS

Figure 1:
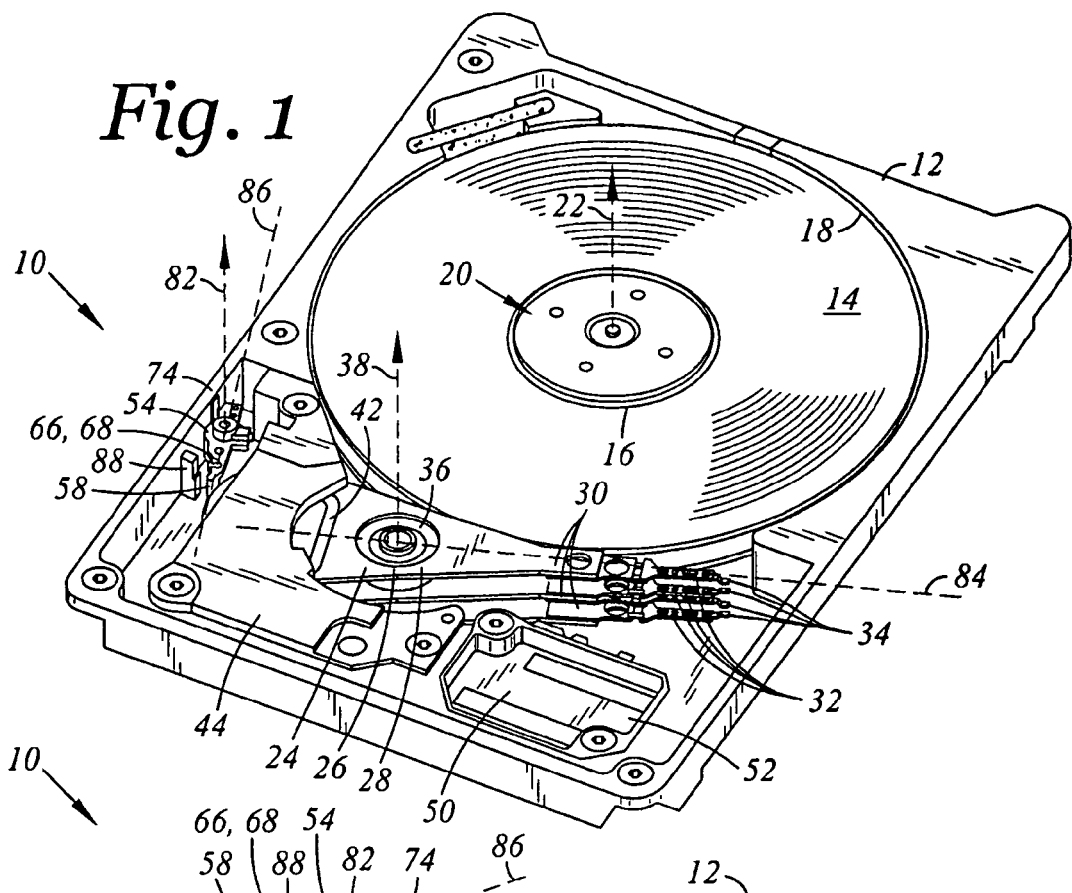
FIG. 1 is a top perspective view of a disk drive (without any cover shown) including a latch (in a closed position) and an actuator (in a parked position) according to an embodiment of the present invention.
Figure 2:
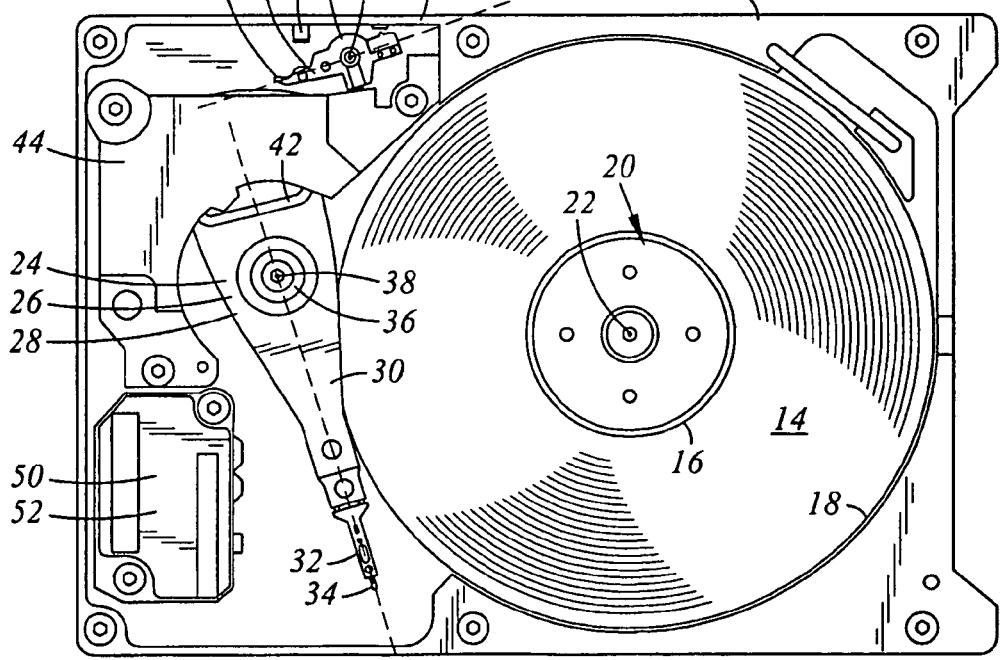
FIG. 2 is a top plan view of a disk drive according to an embodiment of the present invention.
Figure 3:
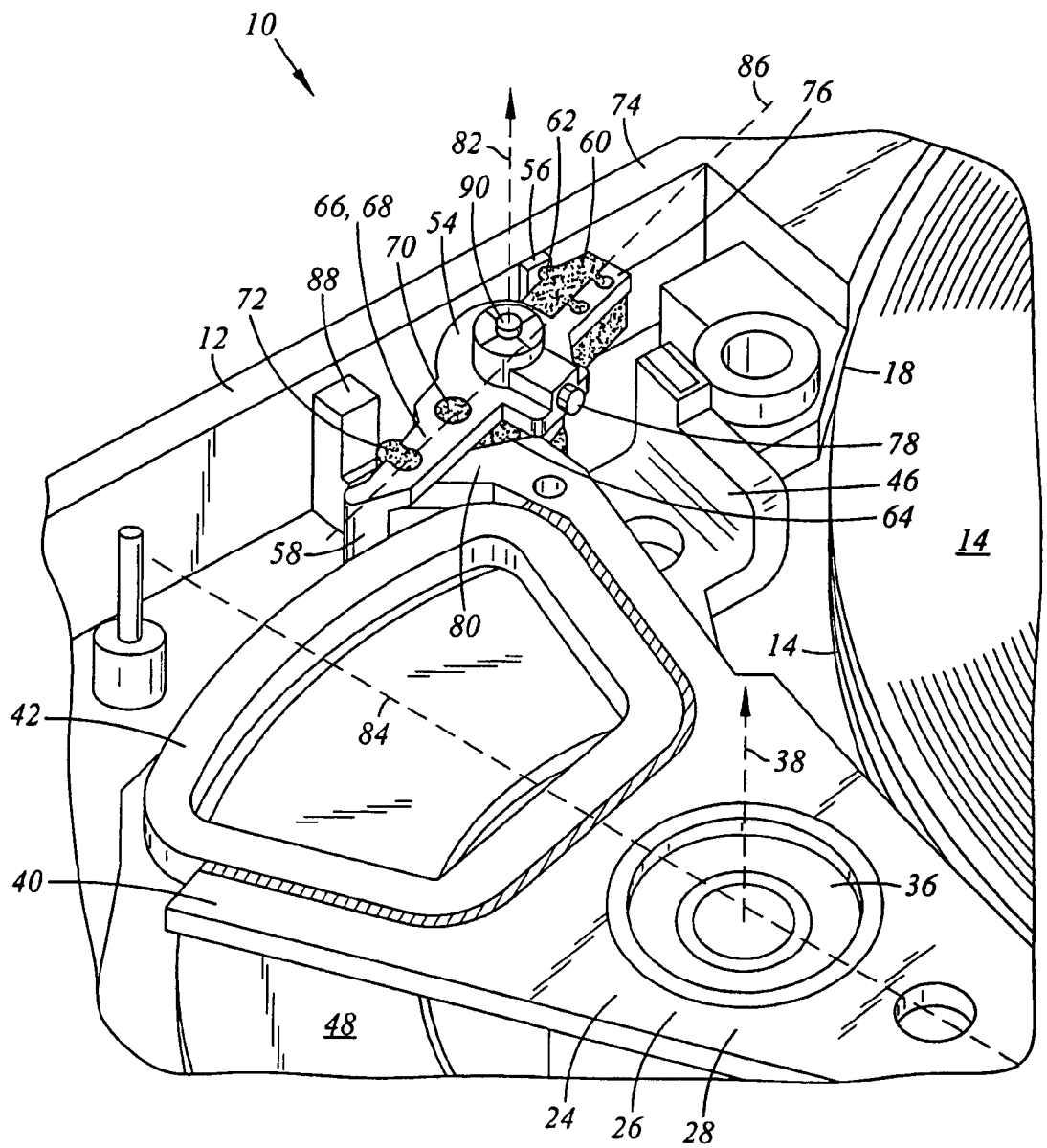
FIG. 3 is an enlarged top perspective view of a portion of a disk drive according to an embodiment of the present invention (without a top VCM plate shown for ease of illustration) with the latch in a closed position and a portion of the actuator (in a parked position)

Referring now to FIGS. 1 and 2, there is respectively depicted a top perspective view and a top plan view of a disk drive 10 according to an embodiment of the present invention. The disk drive 10 includes a head disk assembly (HDA) and a printed circuit board assembly (PCBA) (not shown). The head disk assembly includes a disk drive housing having disk drive housing members, such as a disk drive base 12 and a cover (now shown for ease of illustration of the internal disk drive components). The disk drive base 12 and the cover collectively house disks 14. A single disk or additional disks may be utilized. Each disk 14 includes an inner diameter (ID) 16 and an outer diameter (OD) 18. Each disk 14 further includes a plurality of tracks for storing data. Each disk 14 may be of a magnetic recording type of storage device, however, other arrangements such as optical recording may be utilized. The head disk assembly further includes a spindle motor 20 for rotating the disks 14 about a disk rotation axis 22. The head disk assembly further includes a head stack assembly 24 rotatably attached to the disk drive base 12 in operable communication with the disks 14. The head stack assembly 24 includes an actuator 26.

The actuator 26 includes an actuator body 28 and actuator arms 30 that extend from the actuator body 28. For angular reference purposes, each actuator arm 30 may define an actuator arm longitudinal axis 84. Distally attached to the actuator arms 30 are suspension assemblies 32. The suspension assemblies 32 respectively support heads 34. The suspension assemblies 32 with the heads 34 are referred to as head gimbal assemblies. It is contemplated that the number of actuator arms and suspension assemblies may vary depending upon the number of disks and disk surfaces utilized.

Each head 34 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 14. The disk 14 includes opposing disk surfaces. In magnetic recording applications the disk surface typically includes one or more magnetic layers. Data may be recorded along data annular regions on a single disk surface or both.

The head stack assembly 24 may be pivoted such that each head 34 is disposed adjacent to the various data annular regions from adjacent to the outer diameter 18 to the inner diameter 16 of the disk 14. In the embodiment shown, the actuator body 28 includes a bore, and the actuator 26 further includes a pivot bearing cartridge 36 engaged within the bore for facilitating the actuator body 28 to rotate between limited positions about an axis of rotation 38.

The actuator 26 further includes a coil support element 40 that extends from one side of the actuator body 28 opposite the actuator arms 30. The coil support element 40 is configured to support a coil 42. A top VCM plate 44 may be provided as shown in FIGS. 1 and 2. The top VCM plate 44 is not shown in FIGS. 3-10 so as to ease illustration of the other disk drive components. A bottom VCM plate 46 with an attached VCM magnet 48 may also be provided as can be seen in FIGS. 3-10. The coil 42 is positioned between the VCM magnet 48 and the top VCM plate 44 to form a voice coil motor for controllably rotating the actuator 26.

The head stack assembly 24 further includes a flex cable assembly 50 (details of which are not shown for ease of illustration the actuator 26; for example a flex cable and pre-amplifier circuitry is not shown) with a cable connector 52. The cable connector 52 is attached to the disk drive base 12 and is disposed in electrical communication with the printed circuit board assembly. The flex cable assembly 50 supplies current to the coil 42 and carries signals between the heads 34 and the printed circuit board assembly.

With this configuration, current passing through the coil 42 results in a torque being applied to the actuator 26. A change in direction of the current through the coil 42 results in a change in direction of the torque applied to the actuator 26. It is contemplated that other magnet, VCM plate, coil and magnet support configurations may be utilized, such as a multiple coil arrangements, single or double VCM plates and a vertical coil arrangement.

Figure 4:
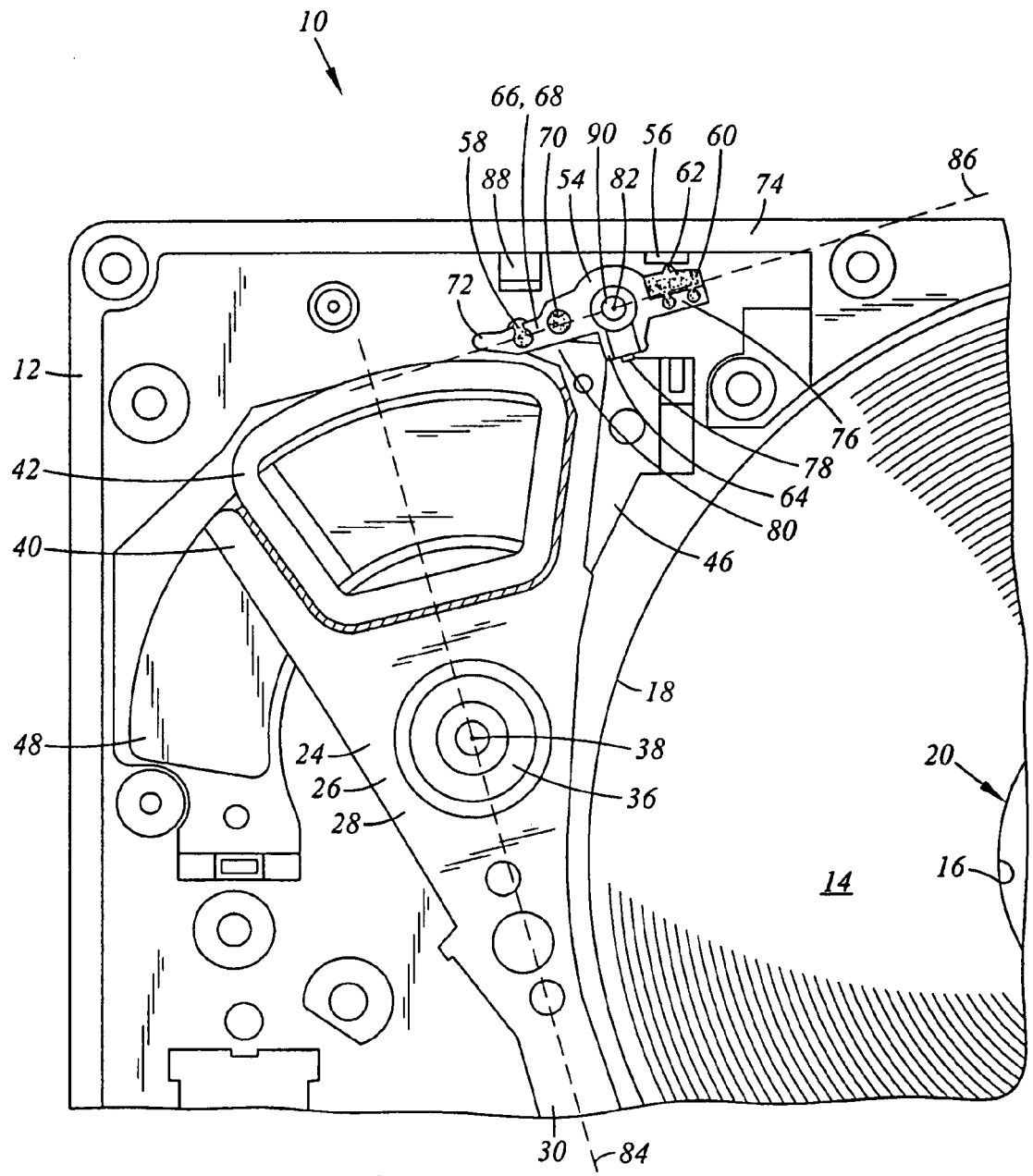
FIG. 4 is a top plan view of the portion of the disk drive of FIG. 3.
Figure 5:
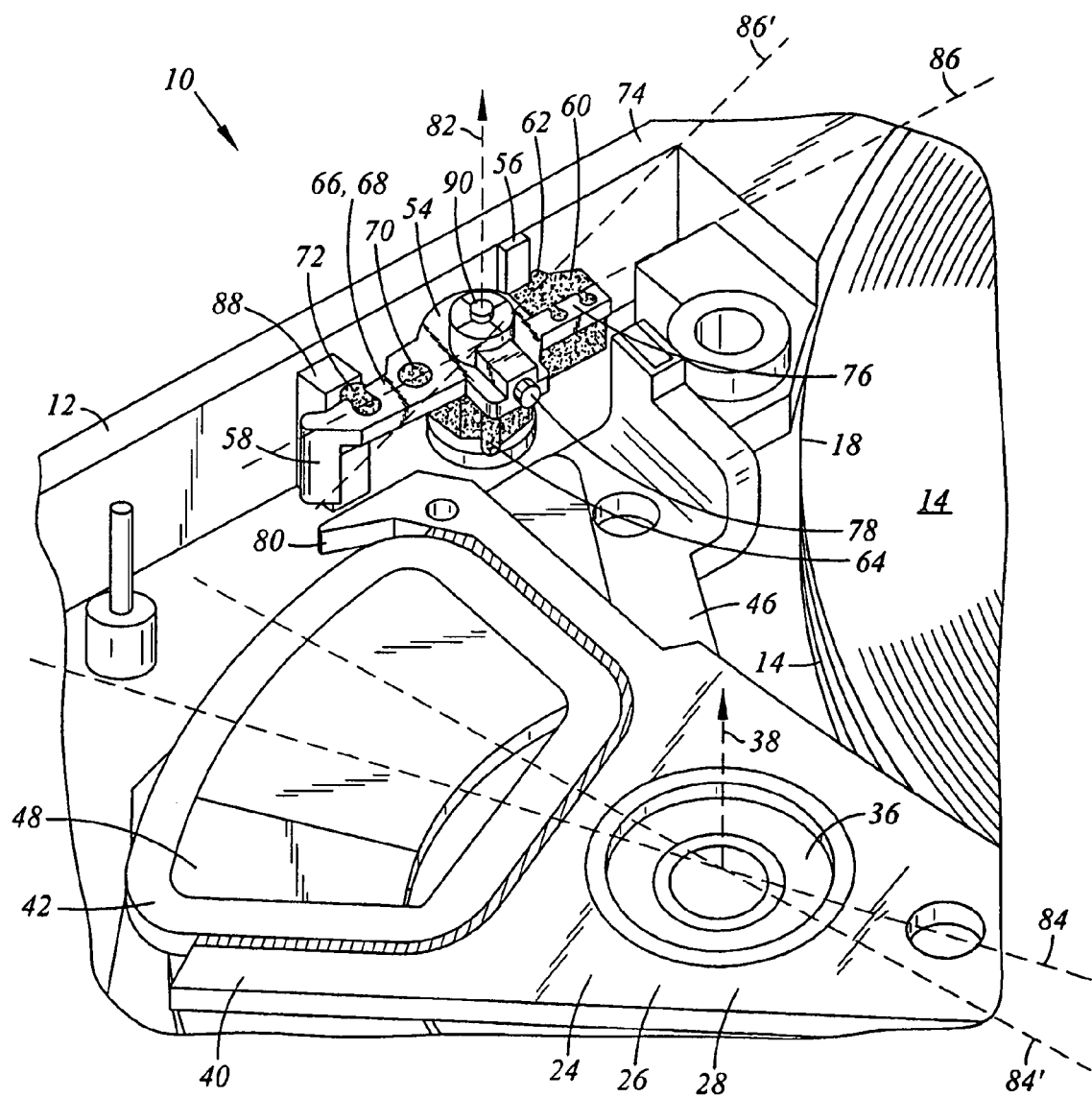
FIG. 5 is an enlarged top perspective view of a portion of the disk drive according to an embodiment of the present invention with the latch in a open position and the actuator in an operable position.
Figure 6:
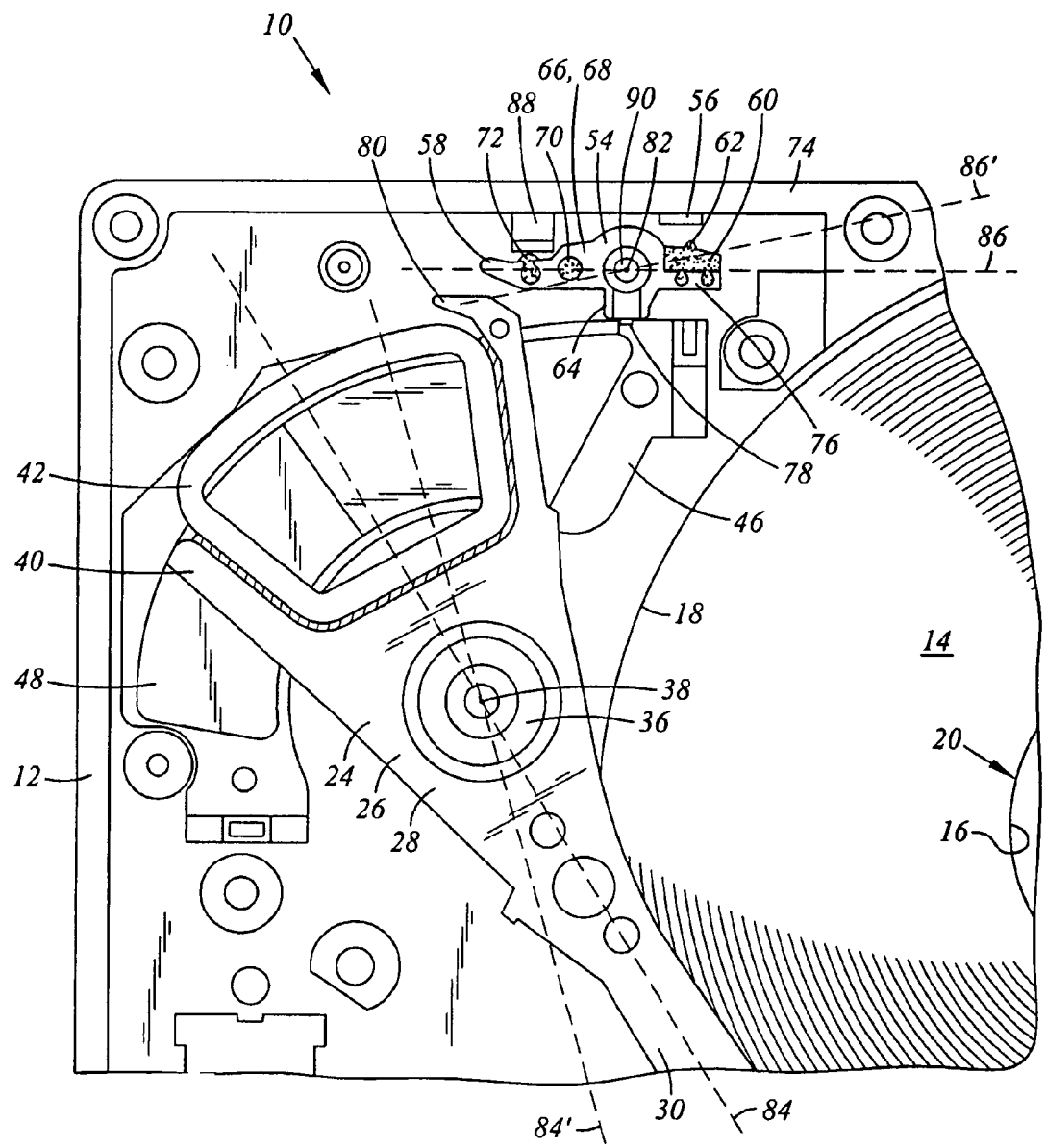
FIG. 6 is a top plan view of the portion of the disk drive of FIG. 5.
Figure 7:
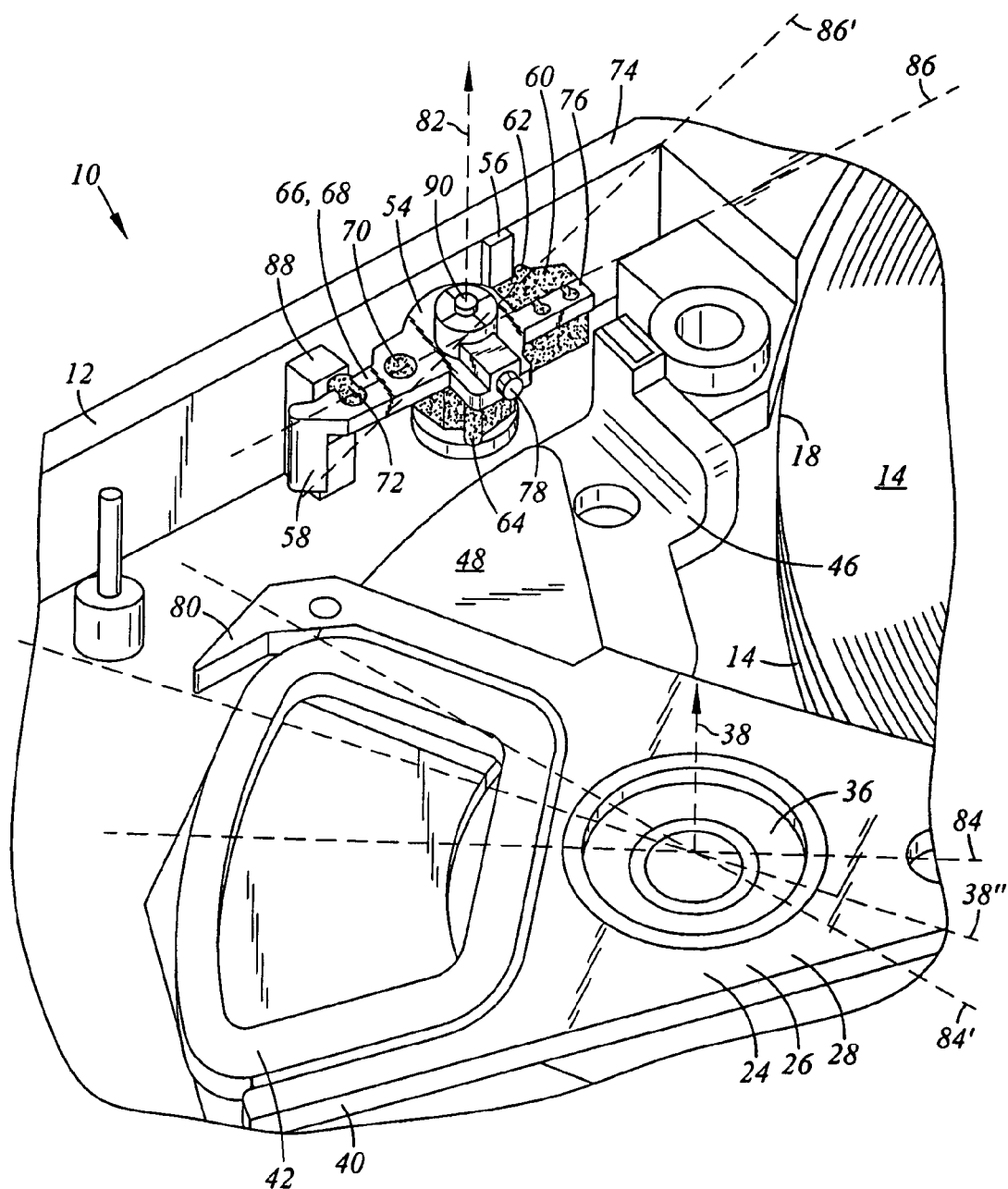
FIG. 7 is an enlarged top perspective view of a portion of the disk drive similar to that shown in FIG. 3, however, with the latch in a open position and the actuator in an extreme angular position (rotated fully counter-clockwise)
Figure 8:
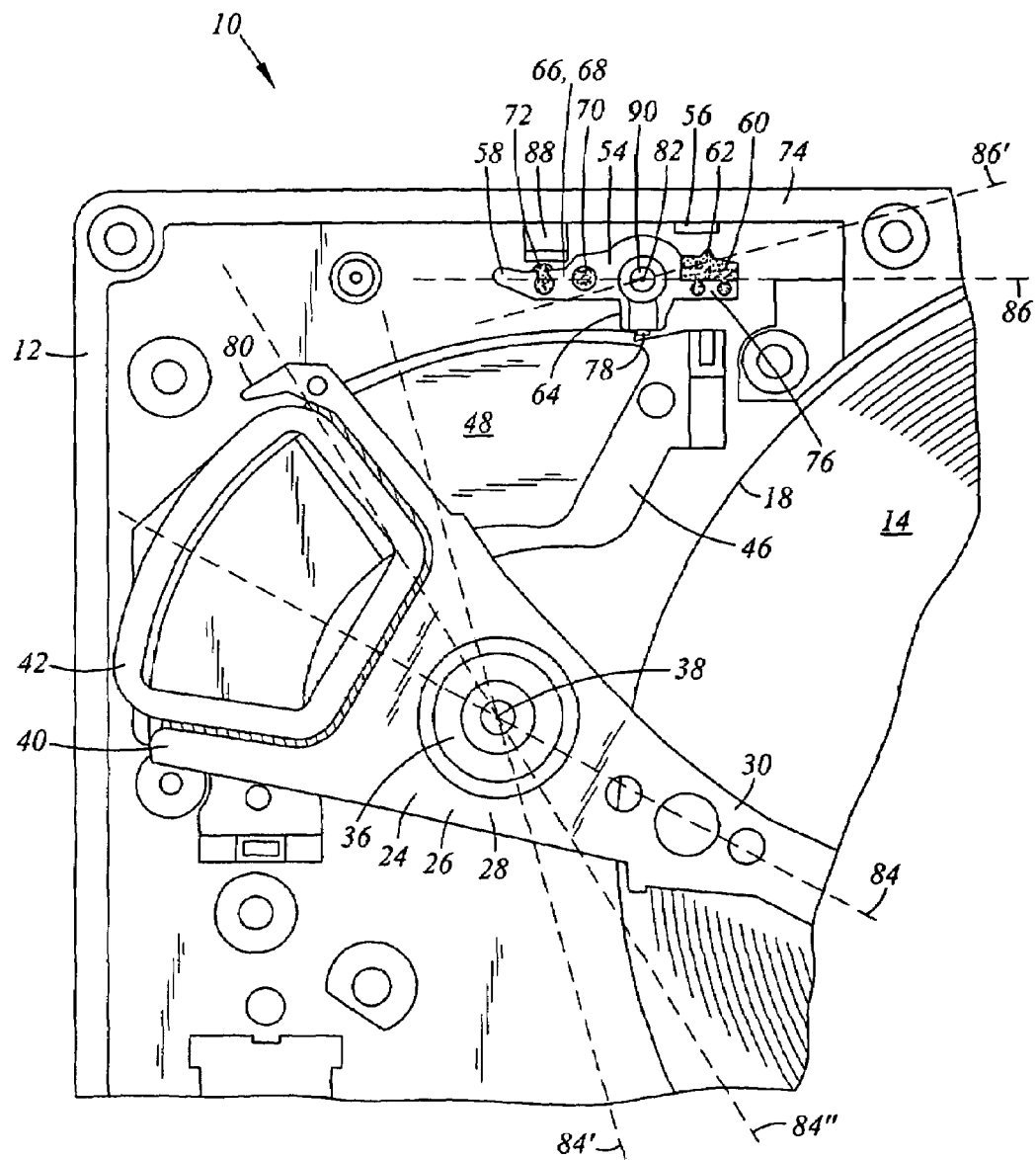
FIG. 8 is a top plan view of the portion of the disk drive of FIG. 7.
Figure 9:
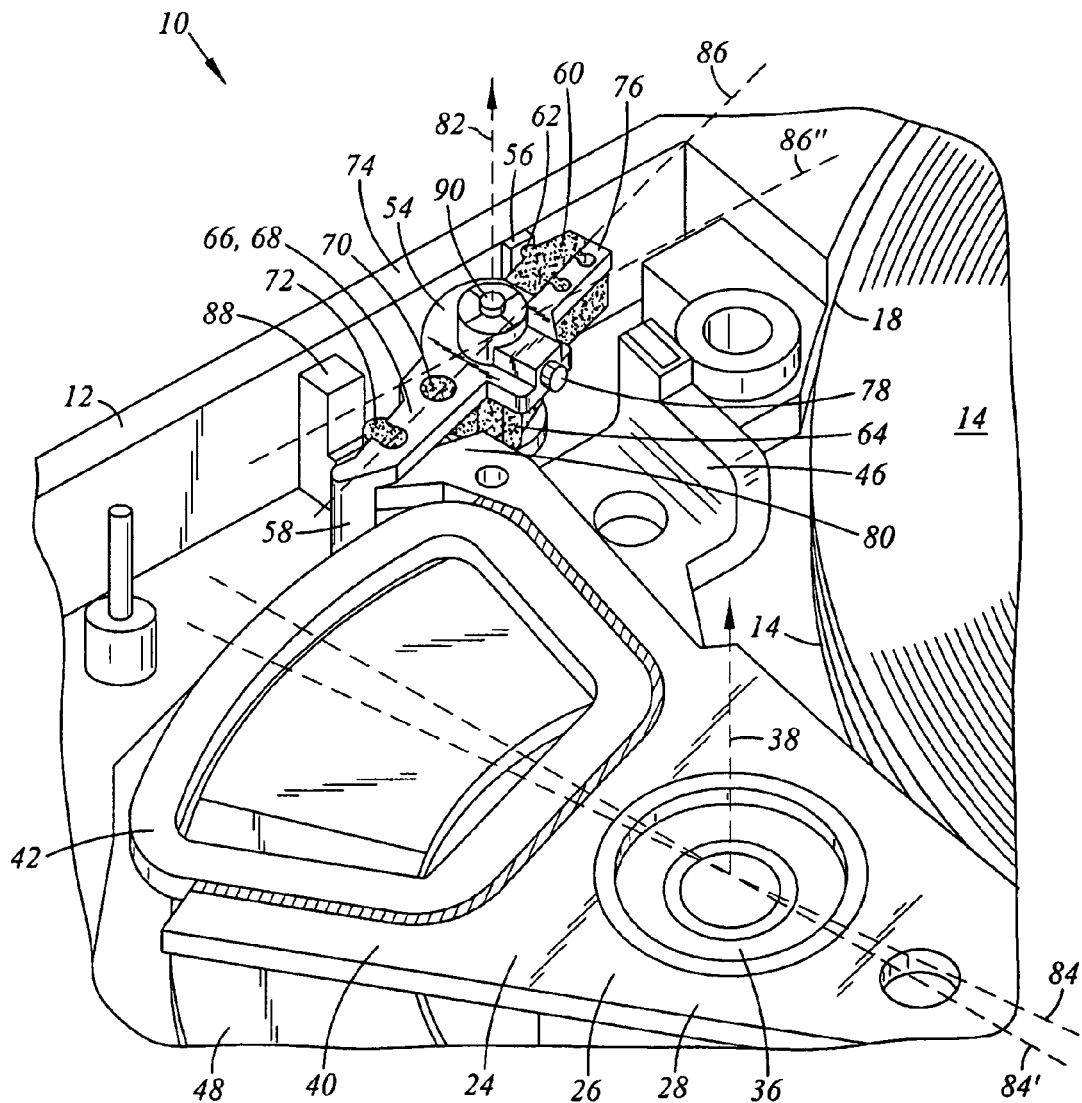
FIG. 9 is an enlarged top perspective view of a portion of a disk drive according to an embodiment of the present invention with the latch in a closed position and the actuator in an latched position.
Figure 10:
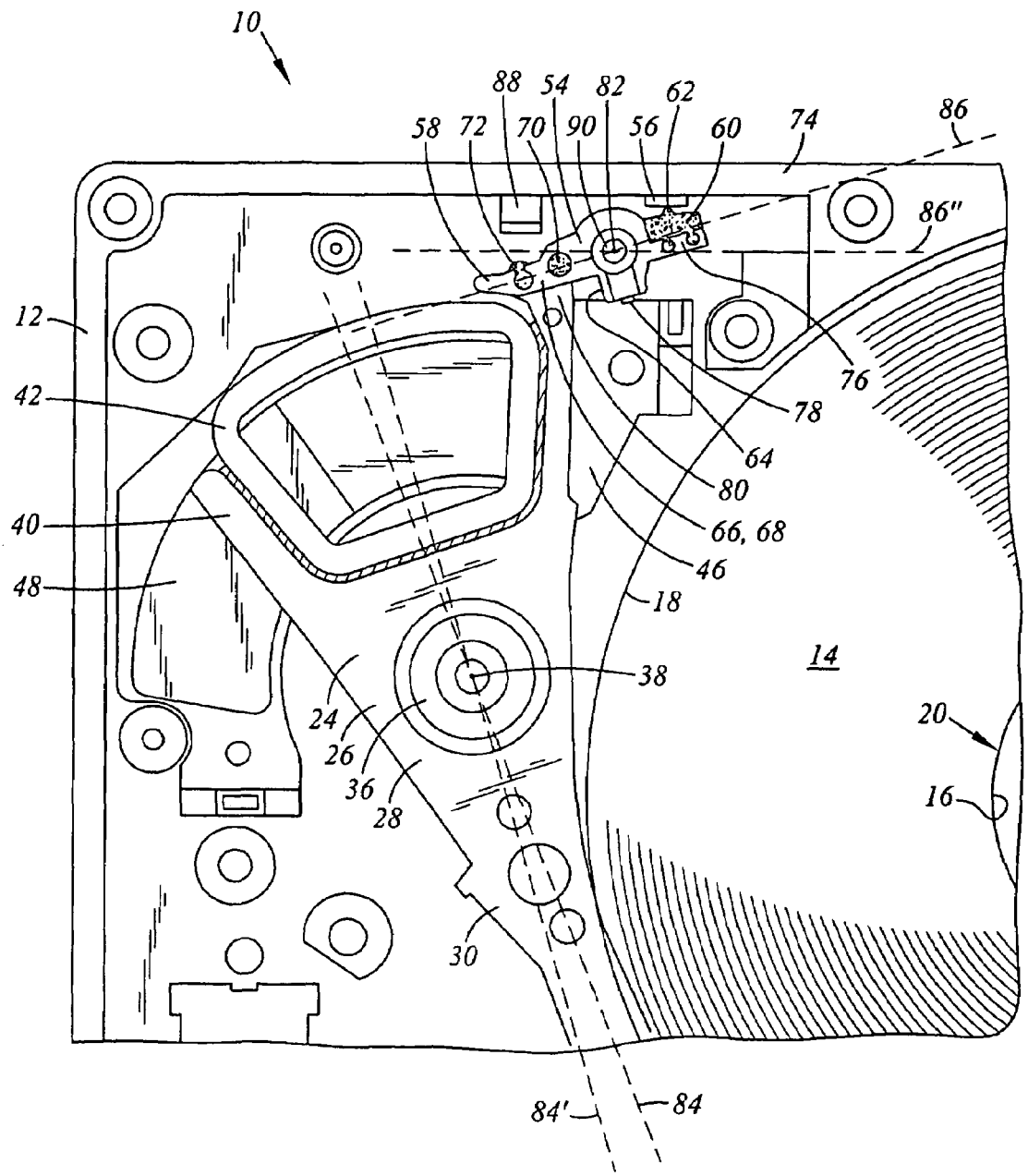
FIG. 10 is a top plan view of the portion of the disk drive of FIG. 9.
Figure 11:
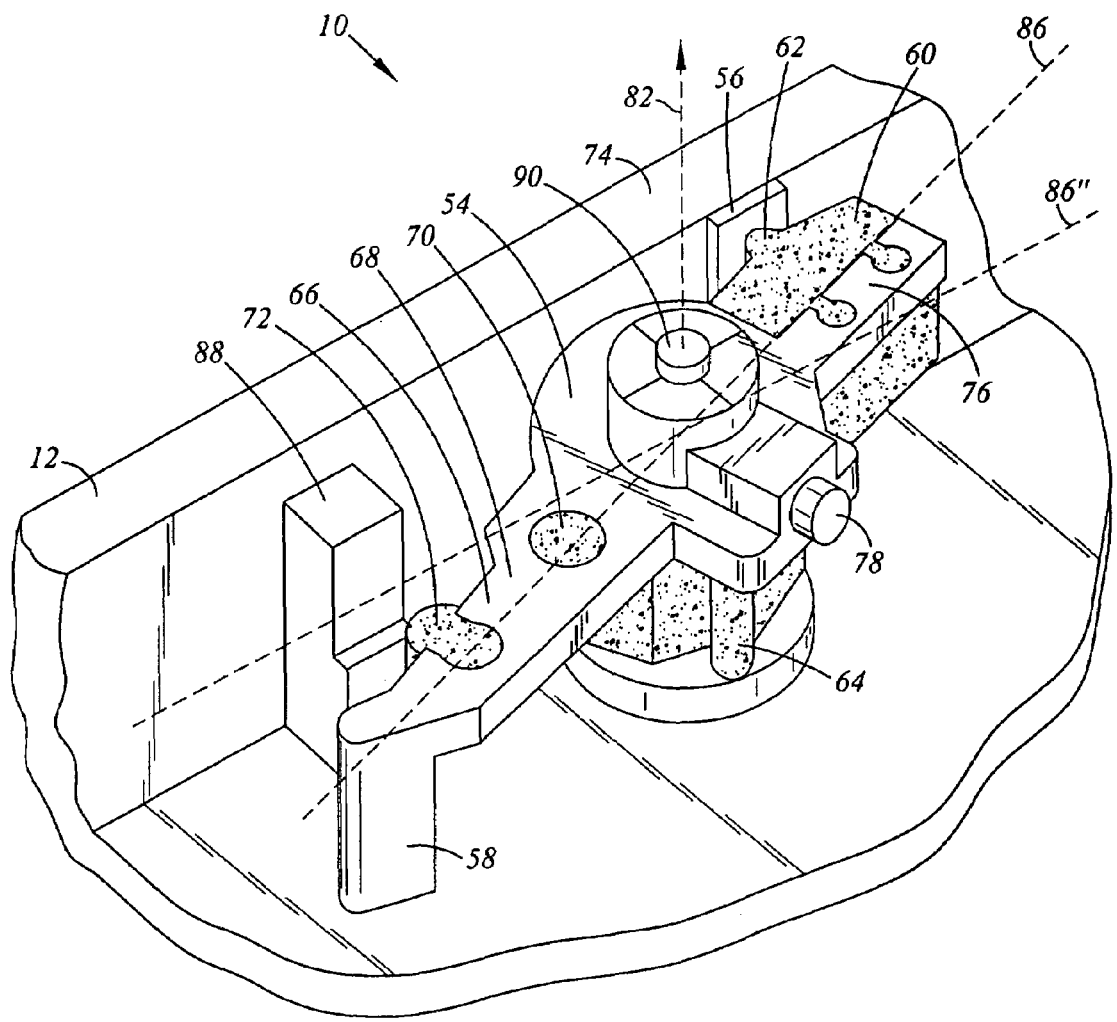
FIG. 11 is an enlarged perspective view of a portion of a disk drive according to an embodiment of the present invention, illustrating the latch in a closed position.
Figure 12:
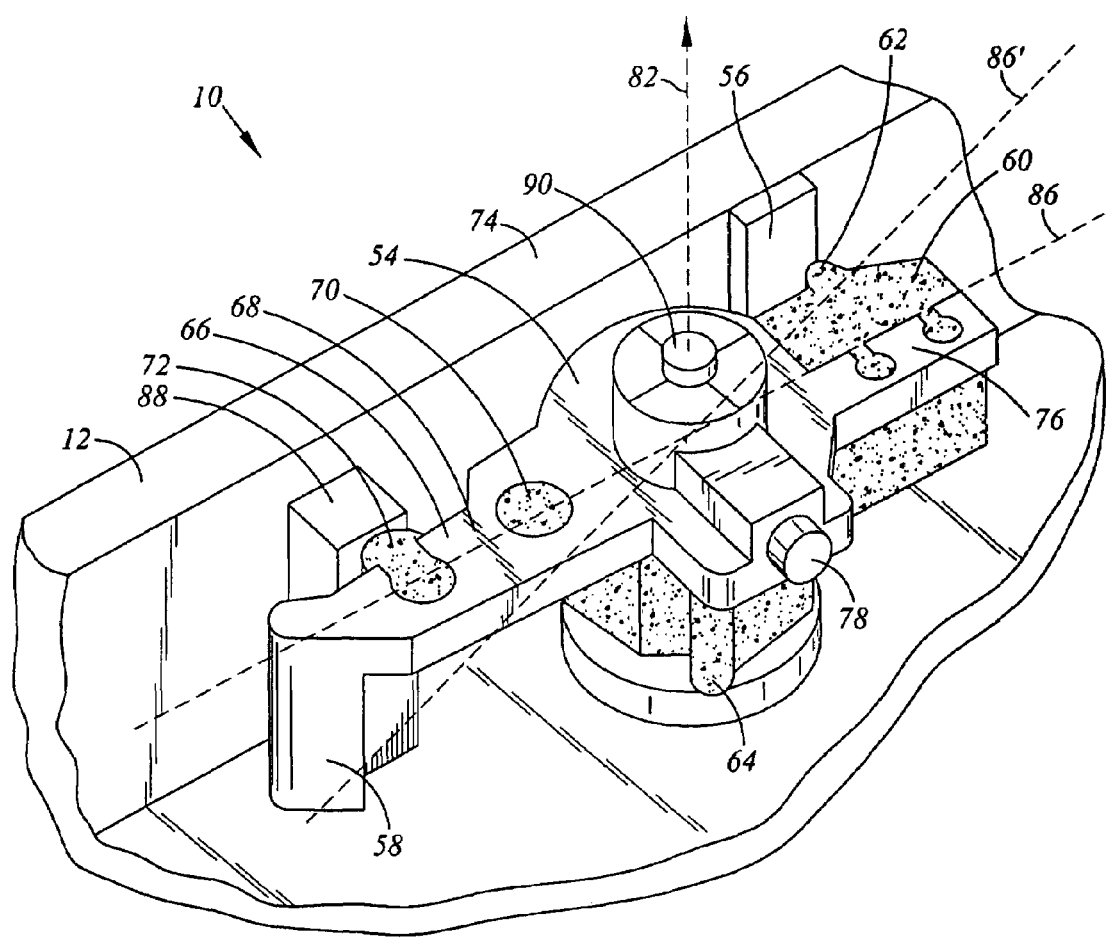
FIG. 12 is an enlarged perspective view of a portion of a disk drive according to an embodiment of the present invention, illustrating the latch in an open position.

As will be discussed in detail below, the disk drive 10 includes a latch 54. Referring now additionally to FIGS. 3-12, FIG. 3 is an enlarged top perspective view of a portion of the disk drive 10 according to an embodiment of the present invention (without the top VCM plate 44 shown for ease of illustration) with the latch 54 (in the closed position) and a portion of the actuator 26 (in the parked position). FIG. 4 is a top plan view of the portion of the disk drive 10 according to an embodiment of the present invention. FIG. 5 is an enlarged top perspective view of a portion of the disk drive 10 according to an embodiment of the present invention with the latch 54 in an open position and the actuator 26 in an operable position. FIG. 6 is a top plan view of the portion of the disk drive 10 of FIG. 5. FIG. 7 is an enlarged top perspective view of a portion of the disk drive 10 similar to that shown in FIG. 3, however, with the latch 54 in an open position and the actuator 26 in an extreme angular position (rotated fully counter-clockwise). FIG. 8 is a top plan view of the portion of the disk drive 10 of FIG. 7. FIG. 9 is an enlarged top perspective view of a portion of the disk drive 10 according to an embodiment of the present invention with the latch 54 in a closed position and the actuator 26 in a latched position. FIG. 10 is a top plan view of the portion of the disk drive 10 of FIG. 9. FIGS. 11 and 12 are enlarged perspective views of a portion of the disk drive 10 according to an embodiment of the present invention, illustrating the latch 54 respectively in the closed and in the open positions.

In the embodiments of FIGS. 1-12, the disk drive 10 includes the disk drive base 12. The disk drive 10 further includes a fixed member 56 in fixed spatial relation to the disk drive base 12. The disk drive 10 further includes the actuator 26 rotatably coupled to the disk drive base 12. The disk drive 10 further includes the latch 54 rotatably coupled to the disk drive base 12. The latch 54 includes a catch portion 58 in contact with the actuator 26 with the latch 54 in a closed position. The catch portion 58 is not in contact with the actuator 26 with the latch 54 in an open position. The catch portion 58 comprises a first material. The latch 54 further includes a crash stop portion 60 comprising a second material having a lesser stiffness than the first material. The crash stop portion 60 includes a first stop portion 62 and a pusher portion 64. The first stop portion 62 is in contact with the fixed member 56 with the latch 54 in the closed position. The first stop portion 62 is not in contact with the fixed member 56 with the latch 54 in the open position. The pusher portion 64 is in contact with the 26 actuator with the latch 54 in the closed position and with the actuator 26 in an extreme rotational position.

The disk drive 10 may further comprise a latch post 90 extending from the disk drive base 12. The latch post 90 and the disk drive base 12 may be a single component having material continuity as opposed to being an assembly of subcomponents. The latch 54 may be disposed about the latch post 90 through a post hole in the latch 54. The latch post 90 may define a latch axis or rotation 82 about which the latch 54 is configured to rotate.

As mentioned above, the disk drive 10 includes the fixed member 56 in fixed spatial relation to the disk drive base 12. In this regard, the fixed member 56 may be a disk drive base wall 74 of the disk drive base 12 itself. The fixed member 56 and the disk drive base 12 may both be a single component having material continuity rather than an assembly of subcomponents. This can serve to reduce the number of components and avoid assembly of such components. However, the fixed member 56 may be a separately formed piece of material which is attached to the disk drive base 12. All that is required is that the fixed member 56 maintains its position relative to the disk drive base 12.

As mentioned above, the crash stop portion 60 comprises the second material. Either or both of the first stop portion 62 and/or the pusher portion 64 may comprise the second material. In the embodiment shown, both of the first stop portion 62 and the pusher portion 64 comprise the second material. Further, the first stop portion 62 and the pusher portion 64 may both be a single component having material continuity rather than an assembly of subcomponents, such as in the embodiment shown. This can serve to reduce the number of components and avoid assembly of such components.

The latch 54 may include a latch arm 66. The latch arm 66 may include the catch portion 58, an arm body portion 68 supporting the catch portion 58, and an arm damping portion 70. The arm damping portion 70 may also comprise the second material. Though not required, the pusher portion 64, the first stop portion 62, and the arm damping portion 70 may all be a single component having material continuity rather than an assembly of subcomponents. Again, this can serve to reduce the number of components and avoid assembly of such components.

The latch 54 may further comprise a second stop portion 72 in contact with a fixed member 88 with the latch 54 in the open position. The second stop portion 72 is not in contact with the fixed member 88 with the latch 54 in the closed position. The fixed member 88 may be integrally formed with the fixed member 56. In this regard, though not required, the fixed member 88 and the fixed member 56 may both be portions of the disk drive base wall 74.

The second stop portion 72 may also comprise the second material. The pusher portion 64, the first stop portion 62, and the second stop portion 72 may all be a single component having material continuity rather than an assembly of subcomponents. This can serve to reduce the number of components and avoid assembly of such components.

The crash stop portion 60 may include a support portion 76. The support portion 76 supports the first stop portion 62. The support portion 76 may comprise a material having a stiffness greater than the first stop portion 62. In this regard, the support portion 76 may comprise the first material. In the embodiment shown, the support portion 76, the arm body portion 68, and the catch portion 58 are all a single component having material continuity rather than an assembly of subcomponents. As repeated mentioned above, this can serve to reduce the number of components and avoid assembly of such components.

The catch portion 58 may be of various shapes and sizes and be configured to engage the actuator 26 in alternate ways. For example, the catch portion 58 need not be configured to receive the catch 80 in the form of a hook. The catch portion 58 could be formed as a hook and the catch 80 could be formed to receive such hook. It is contemplated that the catch 80 may be of other configurations such a tang or pin. As such, it is only required that the catch portion 58 in the closed position be positioned along a path of a portion of the actuator 26 such that contact between the catch portion 58 and such portion of the actuator 26 can occur so as to prevent rotational movement of the actuator 26 in a given direction.

As further mentioned above, the catch portion 58 is in contact with the actuator 26 with the latch 54 in a closed position. In this regard, the catch portion 58 may be contacted by the actuator 26, provided the actuator 26 is in the appropriate position such as depicted in FIGS. 9 and 10. Thus, the catch portion 58 need not always be in contact with the actuator 26, rather the catch portion 58 is capable of contacting with the actuator 26.

As mentioned above, the second material has a lesser stiffness than the first material. In this regard, the first material may comprise a polycarbonate material and the second material may comprise a polyurethane material. In certain embodiments, those components that are made of the second material are those components that come in contact with other ones of the disk drive components upon impact. By comparison, those components that are made of the first material are those components that do not come in contact with other ones of the disk drive components upon impact. Rather, in comparison to each other, those components made of the first material may serve a skeletal or framework function so as to generally form the latch 54 itself and to support those components comprising the second material. Thus, utilization of the second material for those impacting components facilitates an audibly quite latch in comparison to one in which all of the latch components were to be made of the relatively stiffer first material. Moreover, such impacts may also give rise to undesirable vibration which is mitigated by the relatively less stiff second material.

It is noted that the catch portion 58 and the catch 80 of the actuator 26 are configured to impact one another, however, this is does not occur during normal disk drive operations. As such, any audible noise or vibration is of no consumer concern.

The latch 54 may be biased to the open position. The latch 54 may further include a latch biasing element 78. The latch biasing element 78 may comprise a third material that is a ferromagnetic metal material, such as a steel ball bearing (e.g. 400 series stainless steel). The latch biasing element 78 may be magnetically attracted towards the VCM magnet 48. Such magnetic interaction with the latch biasing element 78 results in a biasing force upon the latch 54. Other biasing techniques for the latch 54 may be implemented. For example, a mechanical spring may be attached between the latch 54 and the disk drive base 12. In addition, it is contemplated that the latch 54 could be configured in another embodiment to be biased in a closed position.

Referring now to the embodiments of FIGS. 1-4, as mentioned above, for angular reference purposes each actuator arm 30 may define an actuator arm longitudinal axis 84. Similarly, for angular reference purposes the latch arm 66 is shown to define a latch arm longitudinal axis 86. The actuator 26 is depicted in a parked position as is rotated fully in a clockwise direction with the heads 34 positioned radially beyond the outer diameter 18 of each of the disks 14. The parked position is the disposition that the actuator 26 is configured to come to rest when not performing read or write operations. The latch 54 is depicted in a closed position and is rotated fully in a counter-clockwise direction. The actuator 26 is disposed in contact with the pusher portion 64. In particular, the backside of the catch 80 is in contact of the pusher portion 64. In alternate embodiments, a separate element of the actuator 26 may come in contact with the pusher portion 64. Because the first stop portion 62 of the latch 54 is disposed in contact with the fixed member 56, this configuration prevents the actuator 26 from rotating any further in the clockwise direction. In addition, in the embodiment shown, the pusher portion 64 may be rounded to as to come into contact with the actuator 26 in a cam-like rolling interface upon rotation of the actuator 26 in the clockwise direction upon the actuator 26 moving into the parked position.

Referring now to FIGS. 5 and 6, there is depicted the actuator 26 in an example operable position with the heads 34 positioned somewhere between in the inner diameter 16 and the outer diameter 18 of each of the disks 14. The actuator 26 is shown as having been rotated counter-clockwise from the parked position. An actuator arm longitudinal axis 84' is superimposed for reference purposes to indicate the positioning of the actuator arm longitudinal axis 84 as it had been with the actuator 26 in the parked position. It is assumed that the actuator 26 has been rotated by a controlled VCM induced movement during normal operation of the actuator 26 in performing its read or write operations. In this regard, as the actuator rotates away from the parked position, the latch 54 also begins to rotate from the closed position in a clockwise direction. This is because, in the particular embodiment shown, the latch 54 is biased to the open position. As such, by the time the actuator 26 is rotated near the location of the catch portion 58, the latch 54 has rotated to the open position with the catch portion 58 at a location where the catch portion 58 is not capable of contacting the catch 80 of the actuator 26.

Referring now to FIGS. 7 and 8, there is depicted the actuator 26 having been fully rotated in a clockwise direction with the heads 34 adjacent the inner diameter 16. An actuator arm longitudinal axis 84" is superimposed for reference purposes to indicate the positioning of the actuator arm longitudinal axis 84 as it had been with the actuator 26 in the example operational position as shown in FIGS. 5 and 6.

It is contemplated that the disk drive 10 may be exposed in external forces, such as a mechanical shock event. Where the actuator 26 is in the parked position, such an external force may result in a relatively substantial rotational acceleration having a component about an axis that is parallel to the axis of rotation 38. Where the direction of such rotational acceleration component in such that the disk drive 10 rotates in a clockwise direction (as seen in the views of FIGS. 1 and 2), the actuator 26 would tend to rotate in a counter-clockwise direction. Rotation of the actuator 28 in such a direction would result in the heads 34 being undesirably moved over the disks 14 in a rapid uncontrolled manner resulting in contact between the heads 34 and the disk 14.

However, referring now to FIGS. 9 and 10, when the actuator 26 is rapidly rotated under such conditions, the actuator 26 becomes latched with the actuator 26 in contact with the catch portion 58 such as shown. This is because the latch 54 is still in the closed position and the force is not strong enough to rotate the latch to the open position by the time the actuator 26 is rotated. It is contemplated that the sensitivity of the biasing of the latch 54 to the open position may be adjusted to correspond to the degree of shock induced rotational acceleration that may be experienced by the disk drive 10. For example, where in the latch biasing element 78 is in the form of a ferromagnetic metal, the type, amount and distance from the VCM magnet 48 may be adjusted by design.

What is claimed is:

1. A disk drive comprising:
   a disk drive base;
   a fixed member in fixed spatial relation to the disk drive base;
   an actuator rotatably coupled to the disk drive base; and
   a latch rotatably coupled to the disk drive base, the latch comprising:
      a catch portion in contact with the actuator with the latch in a closed position, the catch portion not in contact the actuator with the latch in an open position, the catch portion comprising a first material; and a crash stop portion, the crash stop portion including a first stop portion and a pusher portion, the first stop portion and the pusher portion each comprising a second material having a lesser stiffness than the first material, the first stop portion in contact with the fixed member with the latch in the closed position, the first stop portion not being in contact with the fixed member with the latch in the open position, the pusher portion in contact with the actuator with the latch in the closed position and with the actuator in an extreme rotational position.

2. The disk drive of claim 1 wherein the latch includes a latch arm, the latch arm including the catch portion, an arm body portion supporting the catch portion, and an arm damping portion and, the arm damping portion comprising the second material.

3. The disk drive of claim 1 wherein the latch further comprises a second stop portion in contact with the fixed member with the latch in the open position, the second stop portion not being in contact with the fixed member with the latch in the closed position, the second stop portion comprising the second material.

4. The disk drive of claim 1 wherein the fixed member is a disk drive base wall of the disk drive base.

5. The disk drive of claim 1 wherein the crash stop portion includes a support portion, the support portion supporting the first stop portion and comprising a material having a stiffness greater than the first stop portion.

6. The disk drive of claim 5 wherein the support portion comprises the first material.

7. The disk drive of claim 1 wherein the latch is biased to the open position.

8. The disk drive of claim 1 wherein the latch further includes a latch biasing element comprising a third material that is a ferromagnetic metal material.

9. The disk drive of claim 8 further comprising a VCM magnet disposed adjacent the actuator, the latch biasing element being magnetically attracted towards the VCM magnet.

10. The disk drive of claim 1 wherein the actuator includes a catch, the catch portion is in contact with the catch with the latch in a closed position.

11. The disk drive of claim 10 wherein the catch is in the shape of a hook.

12. The disk drive of claim 1 wherein the first material comprises a polycarbonate material and the second material comprises a polyurethane material.

\* \* \* \* \*